United States Patent
Lee et al.

(10) Patent No.: US 9,072,124 B2
(45) Date of Patent: Jun. 30, 2015

(54) APPARATUS FOR AND METHOD OF CONTROLLING DIMMING OF STREET LAMP

(75) Inventors: Sang-hun Lee, Suwon-si (KR); Chang-sub Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 155 days.

(21) Appl. No.: 13/528,238

(22) Filed: Jun. 20, 2012

(65) Prior Publication Data
US 2012/0319598 A1  Dec. 20, 2012

(30) Foreign Application Priority Data
Jun. 20, 2011  (KR) .................. 10-2011-0059643

(51) Int. Cl.
*H05B 37/02* (2006.01)

(52) U.S. Cl.
CPC ............ *H05B 37/02* (2013.01); *H05B 37/0245* (2013.01); *H05B 37/0281* (2013.01); *Y02B 20/42* (2013.01); *Y02B 20/72* (2013.01)

(58) Field of Classification Search
CPC .......... H05B 37/0227; H05B 37/0254; H05B 37/0281
USPC ................. 315/149–159, 291, 294, 295, 297, 315/307–309, 312, 360
See application file for complete search history.

(56) References Cited

U.S. PATENT DOCUMENTS

| | | | | |
|---|---|---|---|---|
| 5,949,200 | A * | 9/1999 | Ference et al. | 315/318 |
| 7,872,429 | B2 * | 1/2011 | Steiner et al. | 315/295 |
| 2008/0024074 | A1 * | 1/2008 | Mosebrook et al. | 315/291 |
| 2008/0246417 | A1 | 10/2008 | Numeroli et al. | |
| 2009/0278479 | A1 * | 11/2009 | Platner et al. | 315/312 |
| 2010/0138069 | A1 | 6/2010 | Nerone et al. | |
| 2012/0286770 | A1 * | 11/2012 | Schroder et al. | 324/113 |

FOREIGN PATENT DOCUMENTS

| | | | |
|---|---|---|---|
| KR | 10-2009-0117342 A | 11/2009 | |
| KR | 10-2010-0025207 A | 3/2010 | |
| KR | 10-2010-0078781 A | 7/2010 | |
| WO | 2010085882 A1 | 8/2010 | |

OTHER PUBLICATIONS

Communication dated Jun. 18, 2013 from the European Patent Office in counterpart European application No. 12172100.5.

* cited by examiner

*Primary Examiner* — Tung X Le
(74) *Attorney, Agent, or Firm* — Sughrue Mion, PLLC

(57) ABSTRACT

A dimming controlling apparatus including: a lighting driving unit for driving a lighting appliance; a power supply unit for supplying power required to drive the lighting appliance; a storage unit for storing a plurality of dimming profiles including time zones for driving the lighting appliance and dimming levels in accordance to the time zones; and a controller for controlling the lighting driving unit and the power supply unit by using the dimming profiles. An operating time of the lighting appliance is divided into a plurality of time zones, and dimming profiles are generated to include an intensity of illumination for driving the lighting appliance in each of the plurality of time zones and each of the time zones.

9 Claims, 9 Drawing Sheets

FIG. 11

■ DIMMING PROFILE

PROFILE NAME [parameter.dat]   CONTENT [SUNSET AND SUNRISE TIME, SEOUL]

DIRECTORY [C:₩] [...]

LANGUAGE [KOREAN ▽]   [APPLY]

COUNTRY [REPUBLIC OF KOREA ▽]

LATITUDE [36] (DEGREE)   [45] (MINUTE)   CITY [SEOUL ▽]

LONGITUDE [127] (DEGREE)   [10] (MINUTE)   ⦿ NORTHERN HEMISPHERE   ○ SOUTHERN HEMISPHERE

STANDARD TIME DIFFERENCE [9] (HOUR)   ⦿ EASTERN HEMISPHERE   ○ WESTERN HEMISPHERE

[STORE]

READ | PROFILE SETTING

APPARATUS FOR AND METHOD OF CONTROLLING DIMMING OF STREET LAMP

CROSS-REFERENCE TO RELATED APPLICATIONS

This application claims the benefit of Korean Patent Application No. 10-2011-0059643, filed on Jun. 20, 2011, in the Korean Intellectual Property Office, the disclosure of which is incorporated herein in its entirety by reference.

BACKGROUND

1. Field

The present disclosure relates to a dimming controlling apparatus and method, and more particularly, to an apparatus for and method of controlling dimming of a lighting appliance used in a street lamp.

2. Description of the Related Art

Generally, many lighting appliances which reflect and refract light emitted from a light source and through which light passes, are installed in many living spaces. Such lighting appliances are classified into incandescent lamps, fluorescent lamps, individual reading lights, garden lights, street lamps, and the like according to their purposes.

Among these lighting appliances, street lamps are electrical devices that are installed along streets for street lighting, traffic safety, or fine view. Such street lamps are classified into multi-street lamps, suspension street lamps, and abacus-shaped street lamps according to the installation type. A plurality of lighting appliances, for example, several tens or several hundreds of lighting appliances, are generally installed along streets. Such lighting appliances are controlled via a driving method so that a control center or a main distributing board automatically controls on/off lighting in the night by using a photoconductive element, such as a cadmium sulfide cell.

Currently, many lighting appliances have been replaced with lamps having low power consumption and high brightness. For example, mercury lamps, sodium lamps, and halogen lamps have been replaced with light emitting diodes (LEDs) that have very low electrical energy consumption and are ecofriendly. LED devices generally have a structure in which at least two LEDs are arranged in an array and driven so as to guarantee brightness in the vicinity of the LED devices. LED devices have low power consumption, high brightness, and good durability, and thus, use thereof has increased.

However, when the lighting appliances are controlled by the control center, they cannot be controlled with different settings according to the environment in which each of the lighting appliances is installed. In addition, even when the lighting appliances are controlled using a photoconductive element, their illumination intensities cannot be actively controlled according to the peripheral illumination intensity according to their purposes. In addition, when an LED is used as a light source for a light device, the LED may overheat, and thus, the life span of the LED may be reduced, and the efficiency of the LED may be lowered.

SUMMARY

Provided are dimming controlling apparatuses, whereby an operating time of a lighting appliance is divided into a plurality of time zones, a dimming profile including an illumination intensity for driving the lighting appliance in each of the plurality of time zones and each time zone is generated and the lighting appliance is driven based on the generated dimming profile.

Also provided are dimming controlling apparatuses, whereby a predetermined dimming profile is selected from a plurality of dimming profiles according to certain parameters, such as countries, languages, locations, and standard time differences, and then a lighting appliance is controlled based on the selected dimming profile.

Also provided are dimming controlling apparatuses, whereby at least one sensor is selected from a temperature sensor, an illumination intensity sensor, and a movement sensor, and a lighting appliance is controlled using a sensing signal generated by the at least one sensor.

Additional aspects will be set forth in part in the description which follows and, in part, will be apparent from the description, or may be learned by practice of the presented embodiments.

According to an aspect of the present invention, a dimming controlling apparatus includes: a lighting driving unit for driving a lighting appliance; a power supply unit for supplying power required to drive the lighting appliance; a storage unit for storing a plurality of dimming profiles including time zones for driving the lighting appliance and dimming levels in accordance to the time zones; and a controller for controlling the lighting driving unit and the power supply unit by using the dimming profiles.

The plurality of dimming profiles may be stored in the storage unit, and the dimming controlling apparatus may further include a selection unit for selecting a dimming profile to be used in driving the lighting appliance from a plurality of dimming profiles.

The selection unit may include a dip switch having at least one pin and may select a dimming profile corresponding to an on/off combination of the at least one pin of the dip switch from the plurality of dimming profiles.

The dimming controlling apparatus may further include a communication unit for receiving the dimming profile by wired/wireless communication.

At least one dimming profile received by the communication unit may be stored in the storage unit, and the controller may control the lighting driving unit and the power supply unit via the dimming profile selected from the at least one dimming profile through the communication unit.

The at least one dimming profile may include at least one parameter, such as country, language, location, and standard time difference, and the controller controls the lighting driving unfit and the power supply unit by using the dimming profile selected through the communication unit according to the at least one parameter.

The dimming controlling apparatus may further include a sensor unit including at least one of a temperature sensor, an illumination intensity sensor and a movement sensor, wherein the controller controls the lighting driving unit and the power supply unit via a sensing signal generated by the sensor unit.

According to another aspect of the present invention, a dimming controlling system includes: a management server for generating a plurality of dimming profiles including time zones for driving a lighting appliance and dimming levels corresponding to the time zones; and at least one dimming controlling apparatus for driving the lighting appliance based on the dimming profiles, wherein the at least one dimming controlling apparatus includes: a communication unit for receiving the dimming profiles from the management server by using wired/wireless communication; a storage unit for storing the dimming profiles; a lighting driving unit for driving the lighting appliance; a power supply unit for supplying power required to drive the lighting appliance; and a controller for controlling the lighting driving unit and the power supply unit by using the dimming profiles.

At least one dimming profile received by the communication unit may be stored in the storage unit, and the controller may control the lighting driving unit and the power supply unit by using a dimming profile selected from the at least one dimming profile through the communication unit.

A plurality of dimming profiles may be stored in the storage unit, and the at least one dimming controlling apparatus may further include a selection unit for selecting a dimming profile to be used in driving the lighting appliance from the plurality of dimming profiles.

The selection unit may include a dip switch having at least one pin and may select a dimming profile corresponding to an on/off combination of the at least one pin of the dip switch from the plurality of dimming profiles.

The dimming profiles may include at least one parameter, such as country, language, location, and standard time difference, and the controller may control the lighting driving unfit and the power supply unit using the dimming profile selected by the management server according to the at least one parameter.

The at least one dimming controlling apparatus may further include at least one of a temperature sensor, an illumination intensity sensor and a movement sensor and may control the lighting driving unit and the power supply unit via a sensing signal generated by the at least one sensor.

According to another aspect of the present invention, a dimming controlling method includes: generating a plurality of dimming profiles including time zones for driving a lighting appliance and dimming levels corresponding to the time zones; transmitting the dimming profiles to a dimming controlling apparatus for controlling the lighting appliance; and driving the lighting appliance based on the transmitted dimming profiles.

The dimming controlling method may further include: storing the plurality of dimming profiles in a storage unit of the dimming controlling apparatus; and selecting one dimming profile to be used in driving the lighting appliance from the plurality of dimming profiles.

The plurality of dimming profiles may include at least one parameter, such as country, language, location, and standard time difference, and the lighting appliance may be driven using the dimming profile selected according to the at least one parameter.

The dimming controlling method may further include generating a sensing signal by using at least one of a temperature sensor, an illumination intensity sensor, and a movement sensor and driving the lighting appliance via the generated sensing signal.

BRIEF DESCRIPTION OF THE DRAWINGS

These and/or other aspects will become apparent and more readily appreciated from the following description of the embodiments, taken in conjunction with the accompanying drawings of which:

FIG. 11 illustrates a screen on which a generated dimming profile including parameters is displayed, according to another embodiment of the present invention.

DETAILED DESCRIPTION

Reference will now be made in detail to exemplary embodiments, examples of which are illustrated in the accompanying drawings. In the description of the present invention, certain detailed explanations of related art are omitted when it is deemed that they may unnecessarily obscure the essence of the invention.

Figure 1:
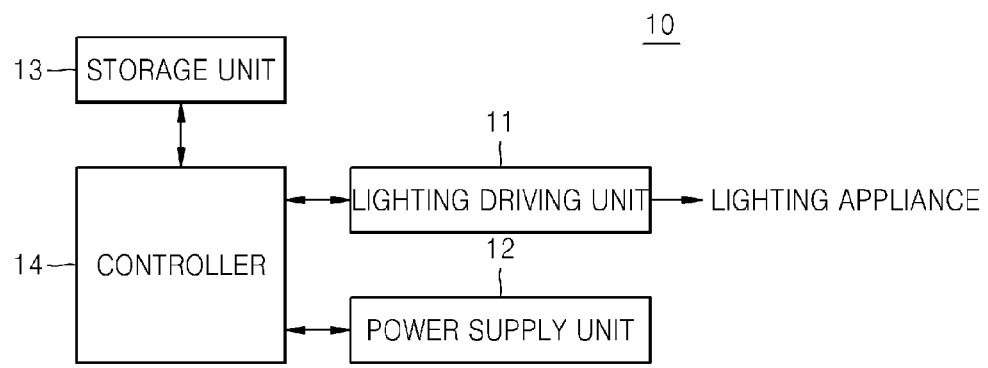
FIGS. 1 and 2 are block diagrams of a dimming controlling apparatus according to some embodiments of the present invention.

FIG. 1 is a block diagram of a dimming controlling apparatus 10 according to some embodiments of the present invention. Referring to FIG. 1, the dimming controlling apparatus 10 according to the current embodiment of the present invention includes a lighting driving unit 11, a power supply unit 12, a storage unit 13, and a controller 14.

The lighting driving unit 11 drives a lighting appliance in response to a control signal transmitted from the controller 14. The lighting appliance may be a white light emitting diode (LED) and/or a red, green, and blue LED that represents the three primary colors of light. In addition, the lighting appliance may include a lamp, such as a high-pressure mercury lamp, a fluorescent lamp, a sodium lamp, a potassium lamp, or a general lamp, which is driven by using a different method from that of an LED. The lighting appliance may be at least one LED when an LED is used as a light source, or both an LED and a lamp that is driven by using a different method from that of the LED may be used.

The lighting driving unit 11 may perform a driving operation, such as on/off lighting control, dimming control, or color control of the lighting appliance. For example, when the lighting appliance is an LED, sequential information about a direct current (DC) driving voltage in a range of 0 and 10 V may be required to perform dimming control, and information about a DC driving voltage about each of red, green, and blue LEDs may be required to perform color control.

The power supply unit 12 supplies power required to drive the lighting driving unit 11 according to a control signal output from the controller 14. The power supply unit 12 may be a voltage converter that uses alternating current (AC) power or may be a switching mode power supply (SMPS) that supplies power by converting AC power into DC power in a switching manner.

In particular, an LED is driven at a DC driving voltage lower than that of a lamp that is driven by using a different method from that of the LED and may be easily damaged due to an unstable DC driving voltage. Thus, when the lighting appliance including an LED is used, the power supply unit 12 may include an SMPS that supplies a constant DC driving voltage without being affected by fluctuation of an external voltage power.

Information required to drive the dimming controlling apparatus of FIG. 1 is stored in the storage unit 13. In addition, a dimming profile for controlling dimming levels according to time zones of the lighting appliance is stored in the storage unit 13. The dimming profile divides a time period required to drive the lighting appliance into a plurality of time intervals, for example, six time intervals, and includes each of the divided time zones and a dimming level for controlling dimming of the lighting appliance at each time zone.

A plurality of dimming profiles may be stored in the storage unit 13. The storage unit 13 may be implemented in one of a volatile recording medium and a non-volatile recording medium including an optical recording medium, a magnetic recording medium, erasable programmable read only memory (EPROM), flash memory, dynamic random access memory (DRAM), or the like, so that the plurality of dimming profiles can be stored in the storage unit 13.

The controller 14 reads the dimming profiles stored in the storage unit 13 and generates a control signal for controlling the lighting driving unit 11 and the power supply unit 12 by using the read dimming profiles. The controller 14 controls the lighting driving unit 11 and the power supply unit 12 according to the time zones and the dimming levels included in the read dimming profiles by using the generated control signal.

Figure 2:
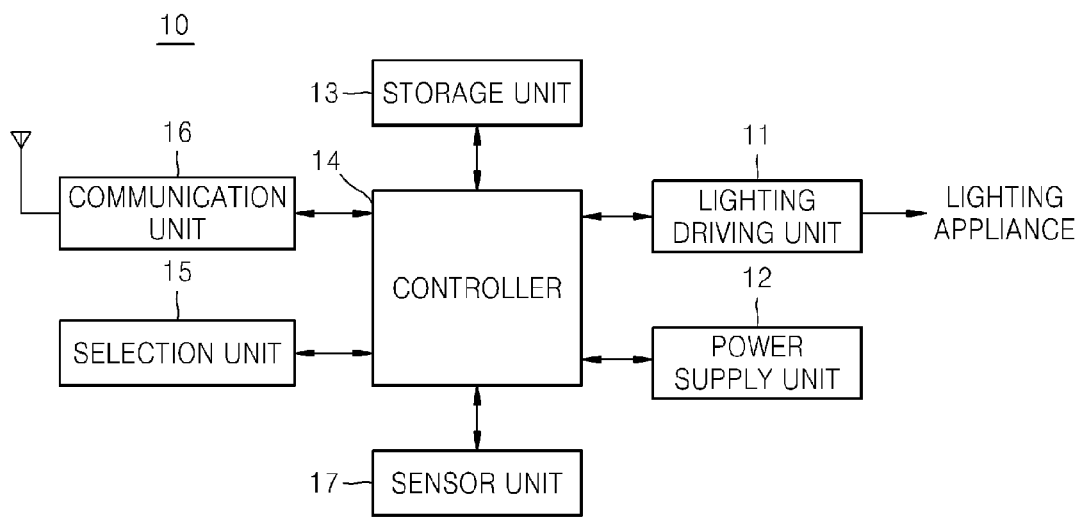

FIG. 2 is a block diagram of a dimming controlling apparatus 10 according to an embodiment of the present invention.

Referring to FIG. 2, the dimming controlling apparatus 10 according to the current embodiment of the present invention may include a selection unit 15. The selection unit 15 may be a keyboard input unit or a touch pad that is integrally formed with a display unit and performs input and output operations simultaneously. The dimming controlling apparatus 10 illustrated in FIG. 2 selects a dimming profile to be used in the lighting appliance, from a plurality of dimming profiles stored in a storage unit 13 by using the selection unit 15 and then drives the lighting appliance by using the selected dimming profile.

According to an embodiment of the present invention, the selection unit 15 may include at least one dip switch. A plurality of modes for driving the lighting appliance may be set by an on/off combination of at least one pin of the dip switch of the selection unit 15. At least one dimming profile stored in the storage unit 13 corresponds to an on/off combination of at least one pin of the dip switch. For example, when the selection unit 15 includes a dip switch having a total of 4 pins, a total of 16 dimming profiles may correspond to on/off combinations of 4 pins. Thus, due to the selection unit 15 having at least one dip switch having 4 pins, the lighting appliance may be driven in 16 modes in total.

Referring to FIG. 2, the dimming controlling apparatus 10 may further include a communication unit 16. The dimming controlling apparatus 10 of FIG. 2 may receive a dimming profile from an external device through wired/wireless communication using the communication unit 16. At least one dimming profile received through the communication unit 16 is stored in the storage unit 13.

Also, the dimming controlling apparatus 10 of FIG. 2 may select a predetermined dimming profile to be used in the lighting appliance from the at least one dimming profile stored in the storage unit 13. In this regard, the at least one dimming profile stored in the storage unit 13 may be a dimming profile received through the communication unit 16 and stored in the storage unit 13 or a dimming profile that is previously stored in the storage unit 13 without using the communication unit 16.

In addition, the dimming controlling unit 10 of FIG. 2 may update firmware required to drive the lighting appliance through the communication unit 16.

According to an embodiment of the present invention, the dimming profile received through the communication unit 16 may include at least one selected from parameters, such as countries, languages, locations and standard time differences, as well as time zones and dimming levels for controlling dimming of the lighting appliance. Dimming profiles including parameters are received through the communication unit 16 and are stored in the storage unit 13. The dimming profiles including parameters are searched for by using each of the parameters as a predetermined keyword through the communication unit 16. A dimming profile for driving the lighting appliance may be selected from the searched-for dimming profiles. The controller 14 controls the lighting driving unit 11 and the power supply unit 12 based on the selected dimming profile, thereby driving the lighting appliance.

For example, an external device connects to the dimming controlling apparatus 10 through the communication unit 16, thereby generating three dimming profiles including language parameters, such as "English", "French", and "German". The external device transmits three dimming profiles to the dimming controlling apparatus 10 and stores them in the storage unit 13. Alternatively, when the dimming controlling apparatus 10 is manufactured, three dimming profiles including different language parameters may be previously stored in the storage unit 13. When a user searches for "English," which is a language parameter, as a keyword through the communication unit 16, a dimming profile including the language parameter "English" is searched for from three dimming profiles stored in the storage unit 13. The searched-for dimming profile is selected as a dimming profile to be used in the lighting appliance and is used to drive the lighting appliance. Parameters other than languages and a detailed method of searching for a dimming profile by using parameters will be additionally described below. The lighting appliance is controlled by using the dimming profile including the parameters described above, so that lighting appliances manufactured in the same manner may be actively controlled in various ways according to the geographical environment of a location in which the lighting appliances are installed or according to their purposes.

The communication unit 16 may be connected to the external device through wired communication, such as a local area network (LAN), and may be used to receive a dimming profile or to select a dimming profile stored in the storage unit 13. Also, the communication unit 16 may be connected to the external device through wireless communication, such as wireless broadband Internet (WiBro), high speed downlink packet access (HSDPA), wireless LAN, worldwide interoperability for microwave access (WiMAX), ZIGBEE, Bluetooth, ultra wideband (UWB), infrared data association (IrDA), or shared wireless access protocol (SWAP) and may be used to receive a dimming profile or to select a dimming profile stored in the storage unit 13.

In addition, the communication unit 16 may include an interface, such as a universal serial bus (USB), ultra direct memory access (UDMA), or a serial/parallel port. The communication unit 16 may be connected to a portable storage medium, for example, USB memory, that may transmit and receive data via the interface. The communication unit 16 may be connected to the portable storage medium and may receive a dimming profile to be used for driving the lighting appliance from the portable storage medium.

As illustrated in FIG. 2, the dimming controlling apparatus 10 may further include a sensor unit 17. The sensor unit 17 may include a temperature sensor, an illumination intensity sensor, a movement sensor, or the like and may generate a sensing signal according to temperature, intensity of illumination, movement, or the like. The controller 14 controls the lighting driving unit 11 and the power supply unit 12 by using the sensing signal generated by the sensor unit 17, thereby controlling driving of the lighting appliance.

The dimming controlling apparatus 10 of FIG. 2 drives the lighting appliance based on the selected dimming profile. However, when a predetermined sensing signal is received from the sensor unit 17, the lighting appliance may be driven according to the received sensing signal.

For example, when a lighting appliance including an LED is driven based on a predetermined dimming profile and the LED overheats due to a high temperature more than a normal temperature, the sensor unit 17 including a temperature sensor generates a sensing signal due to the high temperature and transmits the sensing signal to the controller 14. The controller 14 that receives the sensing signal may protect the lighting appliance by reducing a dimming level of the lighting appliance by a predetermined value according to the received sensing signal or by cutting off power. For example, when the temperature of the lighting appliance is 70° C. or more, the dimming controlling apparatus 10 of FIG. 2 reduces a dimming level by 30%, and when the temperature of lighting appliance falls to be less than 45° C. or less, the dimming controlling apparatus 10 of FIG. 2 returns to its original dimming level, thereby protecting the lighting appliance.

As another example, the dimming controlling apparatus 10 of FIG. 2 may be used in a street lamp installed on a sidewalk. When the movement of a passerby walking in the vicinity of the street lamp is sensed by the movement sensor, the dimming controlling apparatus 10 of FIG. 2 drives the street lamp based on a predetermined dimming profile. When the movement of the passerby is not sensed by the movement sensor for a predetermined amount of time after that, the dimming controlling apparatus 10 cuts off power supplied to the street lamp, thereby reducing energy consumption.

Also, the dimming controlling apparatus 10 of FIG. 2 may optionally use the predetermined dimming profile and the sensing signal. That is, the dimming controlling apparatus 10 allows the communication unit 16 or a dip switch to set a selection mode, thereby optionally controlling the lighting appliance according to the dimming profile or the sensing signal. For example, when the dimming controlling apparatus 10 is set in the selection mode, the controller 14 controls the lighting driving unit 11 and the power supply unit 12 based on the set dimming profile at a usual time zone but controls the lighting driving unit 11 and the power supply unit 12 according to a sensing signal generated by an illumination intensity sensor at a predetermined time zone, thereby controlling the dimming level of the lighting appliance.

Figure 3:
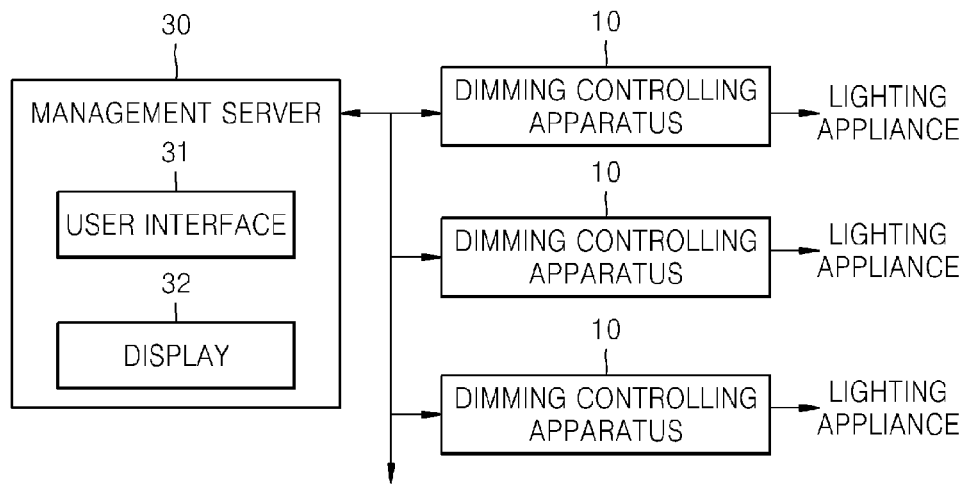
FIG. 3 is a block diagram of a dimming controlling system according to an embodiment of the present invention.

FIG. 3 is a block diagram of a dimming controlling system according to an embodiment of the present invention.

Referring to FIG. 3, the dimming controlling system according to the current embodiment of the present invention includes a management server 30 and a dimming controlling apparatus 10.

As illustrated in FIG. 3, the management server 30 may include a user interface 31, such as a keyboard, or may receive values regarding parameters, such as time zones, dimming levels, countries, languages, locations and standard time differences, which are used to drive the lighting appliance and are input by the user interface 31. The management server 30 generates a plurality of dimming profiles including time zones, dimming levels and parameters according to the input values and transmits the plurality of dimming profiles to the dimming controlling apparatus 10.

As illustrated in FIG. 3, the management server 30 may include a display 32. The management server 30 may read a list regarding the plurality of dimming profiles stored in the storage unit (see 13 of FIG. 1 or 2) of the dimming controlling apparatus 10 and may display the list on the display 32. The management server 30 transmits information about one dimming profile selected from the plurality of dimming profiles displayed on the display 32 to the dimming controlling apparatus 10. The dimming controlling apparatus 10 drives the lighting appliance based on the selected dimming profile displayed on the display 32 of the management server 30.

Also, the management server 30 may select whether to drive the lighting appliance according to one of a sensing signal generated by a temperature sensor, an illumination intensity sensor, and a movement sensor of the dimming controlling apparatus 10 and a dimming profile. Next, the management server 30 transmits information about the selection to the dimming controlling apparatus 10. One of the sensing signal and the dimming profile may be used to drive the lighting appliance, however, the sensing signal and the dimming profile may be optionally used to drive the lighting appliance according to each of time zones for a time for driving the lighting appliance.

Communication between the management server 30 and the dimming controlling apparatus 30 may be wired/wireless communication. Wired communication may be LAN or the like, and wireless communication may be WiBro, HSDPA, Wireless LAN, WiMAX, ZIGBEE, Bluetooth, UWB, IrDA, or SWAP.

In addition, the management server 30 and the dimming controlling apparatus 10 may transmit and receive a dimming profile through a recording medium, for example, USB memory, or may transmit and receive information about the dimming profile to be used in driving the lighting appliance. The management server 30 and the dimming controlling apparatus 10 may include an interface, such as USB, UDMA, or a serial/parallel port, for indirect communication via the recording medium. The management server 30 transmits information about a generated or selected dimming profile to the recording medium via the interface so as to store the information in the recording medium. The recording medium on which the information is recorded is separated from the management server 30 and is connected to the interface of the dimming controlling apparatus 10. The dimming controlling apparatus 10 receives the information stored on the recording medium and drives the lighting appliance based on the generated dimming profile or the selected dimming profile.

Figure 4:
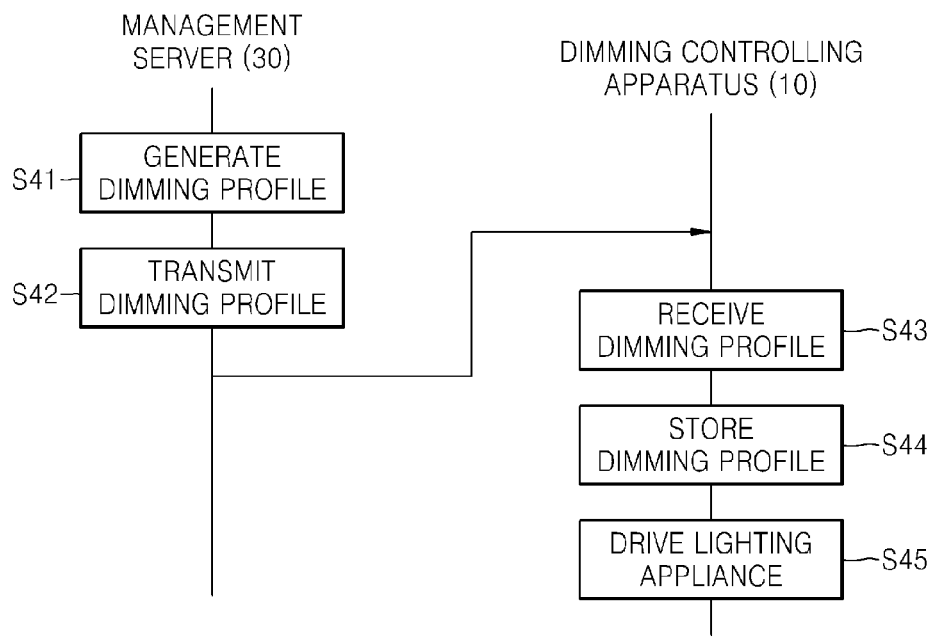
FIGS. 4 and 5 are flowcharts illustrating an operation of the dimming controlling system illustrated in FIG. 3, according to an embodiment of the present invention.
Figure 5:
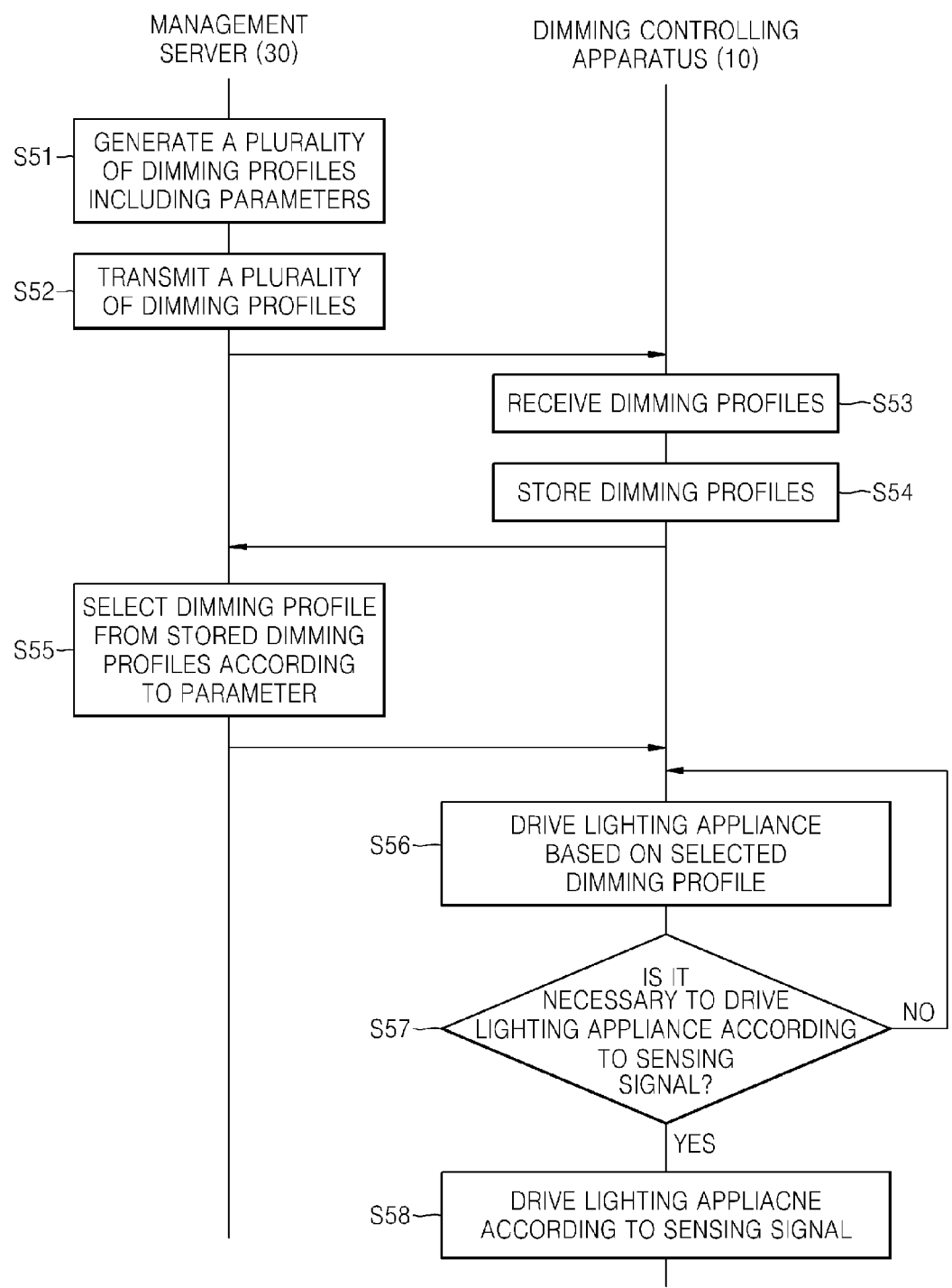

FIGS. 4 and 5 are flowcharts illustrating an operation of the dimming controlling system illustrated in FIG. 3, according to an embodiment of the present invention.

Referring to FIG. 4, the management server 30 generates a dimming profile including a time zone for driving the lighting appliance and a dimming level corresponding to the time zone in operation S41. The management server 30 transmits the generated dimming profile to the dimming controlling apparatus 10 in operation S42. The management server 30 may transmit the dimming profile to at least one dimming controlling apparatus 10. In this regard, the management server 30 may generate at least one dimming profile and may transmit the generated dimming profiles to at least one dimming apparatus 10. The dimming controlling apparatus 10 receives the dimming profiles from the management server 30 in operation S43 and stores the received dimming profiles in the storage unit 13 in operation S44. The dimming controlling apparatus 10 drives the lighting appliance by using the stored dimming profiles in operation S45. When a plurality of dimming profiles are stored in the storage unit 13, the dimming controlling apparatus 10 may select a predetermined dimming profile to be used in driving the lighting appliance from the plurality of dimming profiles, thereby driving the lighting appliance.

The dimming profile may include at least one of parameters, such as countries, languages, locations and standard time differences, as well as the time zones and the dimming levels. The management server 30 may search for a dimming profile by using the parameters, such as countries, languages, locations and standard time differences and may use the dimming profile in driving the lighting appliance.

As illustrated in FIG. 5, the management server 30 generates a plurality of dimming profiles including parameters, such as countries, languages, locations and standard time differences in operation S51. The management server 30 transmits the plurality of dimming profiles to the dimming controlling apparatus 10 in operation S52. The dimming controlling apparatus 10 receives the plurality of dimming profiles in operation S53 and stores them in the storage unit 13 in operation S54. The management server 30 selects a dimming profile from the plurality of dimming profiles stored in the storage unit 13 of the dimming controlling apparatus 10, by using a predetermined parameter in operation S55. For example, the management server 30 searches for a dimming profile having a predetermined value, for example, "English" as a language parameter, from each of the parameters and then displays the searched-for dimming profile on the display 32. The dimming profile to be used in driving the lighting appliance may be conveniently selected from the dimming profiles displayed on the display 32. The dimming controlling apparatus 10 drives the lighting appliance based on the selected dimming profile in operation S56. When the lighting appliance is driven based on the selected dimming profile, if a predetermined sensing signal needs to be received and used in the lighting appliance in operation S57, the dimming controlling apparatus 10 drives the lighting appliance according to the sensing signal in operation S58.

Figure 6:
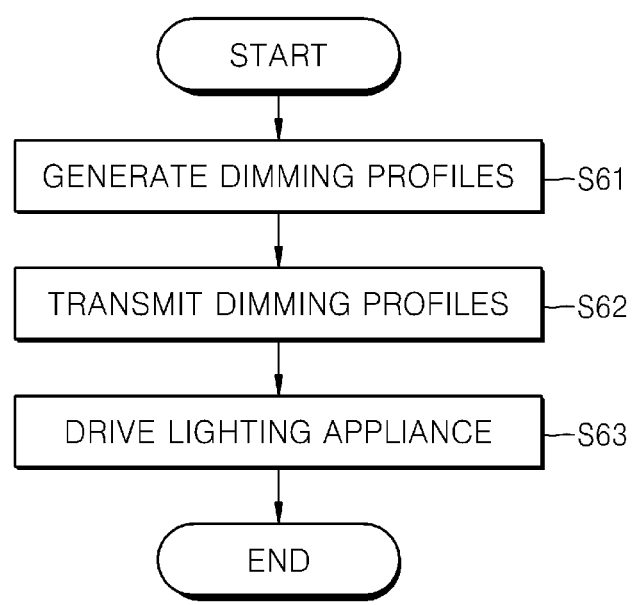
FIGS. 6 and 7 are flowcharts illustrating a dimming controlling method according to some embodiments of the present invention.
Figure 7:
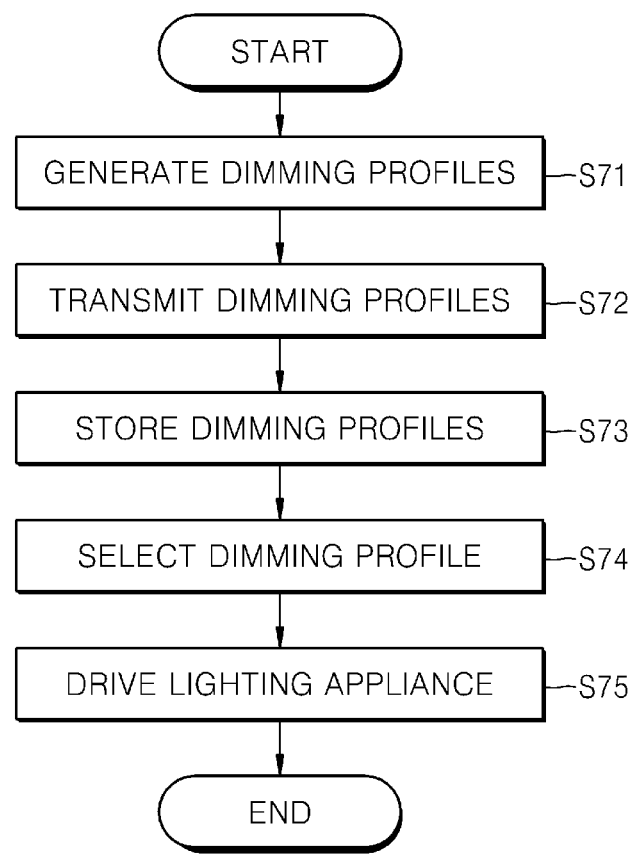

FIGS. 6 and 7 are flowcharts illustrating a dimming controlling method according to some embodiments of the present invention;

Referring to FIG. 6, in operation S61, the management server 30 generates a dimming profile including time zones for driving the lighting appliance and dimming levels corresponding to the time zones.

In operation S62, the management server 30 transmits the generated dimming profile to the dimming controlling apparatus 10. The dimming profile may be transmitted to the dimming controlling apparatus 10 from the management server 30 via wired/wireless communication. In addition, the management server 30 may store the dimming profile in a recording medium, for example, USB memory, and the dimming controlling apparatus 10 may transmit the dimming profile by using a direct transmission method of reading the dimming profile from the recording medium.

In operation S63, the dimming controlling apparatus 10 controls driving of the lighting appliance based on the received dimming profile.

Referring to FIG. 7, according to an embodiment of the present invention, in operation S71, the management server 30 generates a dimming profile including time zones for driving the lighting appliance and dimming levels corresponding to the time zones. The dimming profile may include at least one selected from parameters, such as countries, languages, locations and standard time differences, as well as the time zones and the dimming levels. The management server 30 may receive values regarding parameters, such as time zones, dimming levels, countries, languages, locations and standard time differences, which are used to drive the lighting appliance and are input by a user interface, such as a keyboard. The management server 30 may generate a plurality of dimming profiles including time zones, dimming levels and parameters according to the input values.

In operation S72, the management server 30 transmits the generated dimming profile to the dimming controlling apparatus 10. Transmission of the dimming profile from the management server 30 to the dimming controlling apparatus 10 may be performed via wired/wireless communication or an indirect transmission method using a recording medium.

In operation S73, the dimming controlling apparatus 10 stores the received dimming profile in the storage unit 13. By repeatedly performing operations S71 through S73, at least one dimming profile may be stored in the storage unit 13.

In operation S74, the management server 30 selects a dimming profile required to drive the lighting appliance from the at least one dimming profile stored in the storage unit 13 of the dimming controlling apparatus 10. According to an embodiment of the present invention, the management server 30 may read a list of a plurality of dimming profiles stored in the dimming controlling apparatus 10 and then may display the list on a display (see 32 of FIG. 3) of the dimming controlling apparatus 10 so that one dimming profile may be easily selected from the plurality of dimming profiles. In addition, the management server 30 may search for a dimming profile by using parameters, such as countries, languages, locations, and standard time differences. That is, the management server 30 searches for a dimming profile having a predetermined setting value, for example, "English" as a language parameter, from each of the parameters, and then displays the searched-for dimming profile on the display (see 32 of FIG. 3), thereby conveniently selecting a dimming profile to be used in the lighting appliance. The management server 30 transmits information about the selected dimming profile to the dimming controlling apparatus 10.

In operation S75, the dimming controlling apparatus 10 controls driving of the lighting appliance based on the selected dimming profile.

The dimming controlling method illustrated in FIG. 7 may include generating a sensing signal according to temperature, intensity of illumination, or movement by using at least one of a temperature sensor, an illumination intensity sensor, and a movement sensor. Subsequently, in the dimming controlling method of FIG. 7, driving of the lighting appliance is controlled using the generated sensing signal.

According to the current embodiment, the lighting appliance is driven by the dimming profile selected by the management server 30. However, when a predetermined sensing signal is generated by the sensor unit (see 17 of FIG. 2), the lighting appliance may be first driven according to the generated sensing signal.

For example, when the lighting appliance is driven based on a predetermined dimming profile and the LED overheats due to a temperature higher than a normal temperature, the temperature sensor generates a sensing signal due to the high temperature. The dimming controlling apparatus 10 may protect the lighting appliance by reducing a dimming level of the lighting appliance by a predetermined value according to the received sensing signal or by cutting off power.

As another example, when the lighting appliance is installed on a sidewalk and the movement of a passerby in the vicinity thereof is sensed by the movement sensor, the dimming controlling apparatus 10 of FIG. 2 drives the street lamp based on a predetermined dimming profile. When no movement of a passerby is sensed by the movement sensor for a predetermined amount of time after that, the dimming controlling apparatus 10 of FIG. 2 cuts off power supplied to the street lamp, thereby reducing energy consumption.

Hereinafter, some embodiments in which a dimming profile to be used in driving the lighting appliance is selected by the management server 30 and the dimming controlling apparatus 10 will be described.

The dimming controlling apparatus 10 according to the present invention may select a dimming profile to be used in driving the lighting appliance in a hardware and/or software manner.

Figure 8:
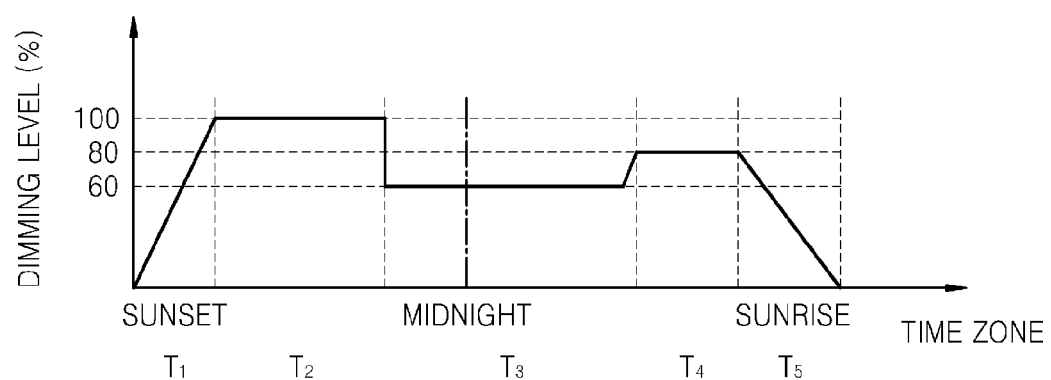
FIG. 8 is a graph showing an example of a dimming profile including time zones and dimming levels.

When a dimming profile is selected using hardware, the dimming controlling apparatus 10 may include a dip switch having a total of 4 pins, for example. The dimming controlling apparatus 10 may store four dimming profiles in the storage unit 13 previously. Each of four dimming profiles may be selected by the dip switch having a total of 4 pins. Three among four dimming profiles are divided into a total of 5 time zones, as illustrated in FIG. 8, and a value for controlling a dimming level of the lighting appliance is included in each of the time zones. The following Table 1 shows dimming levels according to time zones of the dimming profiles illustrated in FIG. 8 and energy efficiency potentials.

TABLE 1

| Time zone | T1 | T2 | T3 | T4 | T5 |
|---|---|---|---|---|---|
| Dimming level (%) | 0-100 | 100 | 60 | 80 | 80-0 |
| Energy efficiency potentials (%) | 50 | 0 | 40 | 20 | 50 |

The remaining dimming profile among four dimming profiles may be a dimming profile to which self-learning is applied. Self-learning means a method by which a time required to drive the lighting appliance is divided into 6 time zones based on midnight and dimming levels are controlled according to time zones. The midnight time may be astronomically calculated from information about the location of the lighting appliance. Alternatively, the midnight time may be calculated from an average between sunset time and sunrise time for several days before the day, for example, from three days before the day.

When a dimming profile is selected using software, the dimming profile may be stored and managed by software installed at the management server 30. The dimming controlling apparatus 10 may be connected to the management server 30 through wired/wireless communication, may receive information about the dimming profile selected by the management server 30, thereby driving the lighting appliance based on the selected dimming profile.

Figure 9:
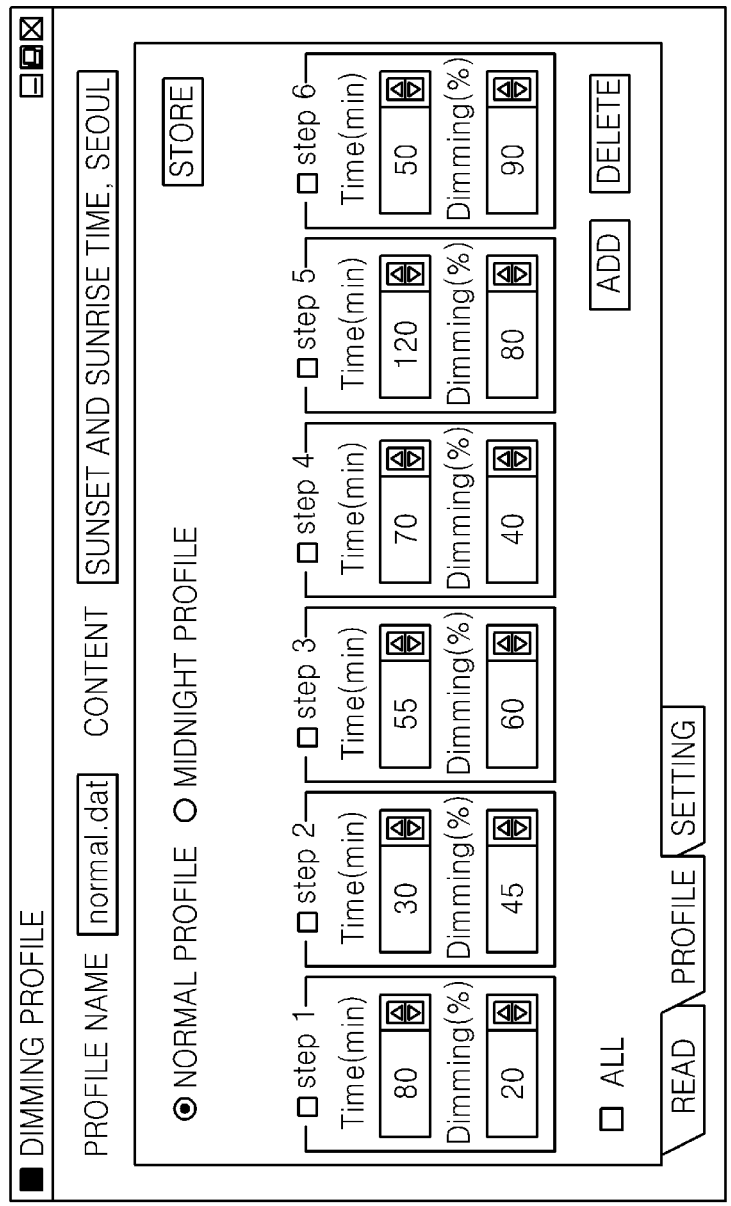
FIGS. 9 and 10 illustrate a screen on which a generated dimming profile including time zones and dimming levels is displayed, respectively, according to some embodiments of the present invention.
Figure 10:
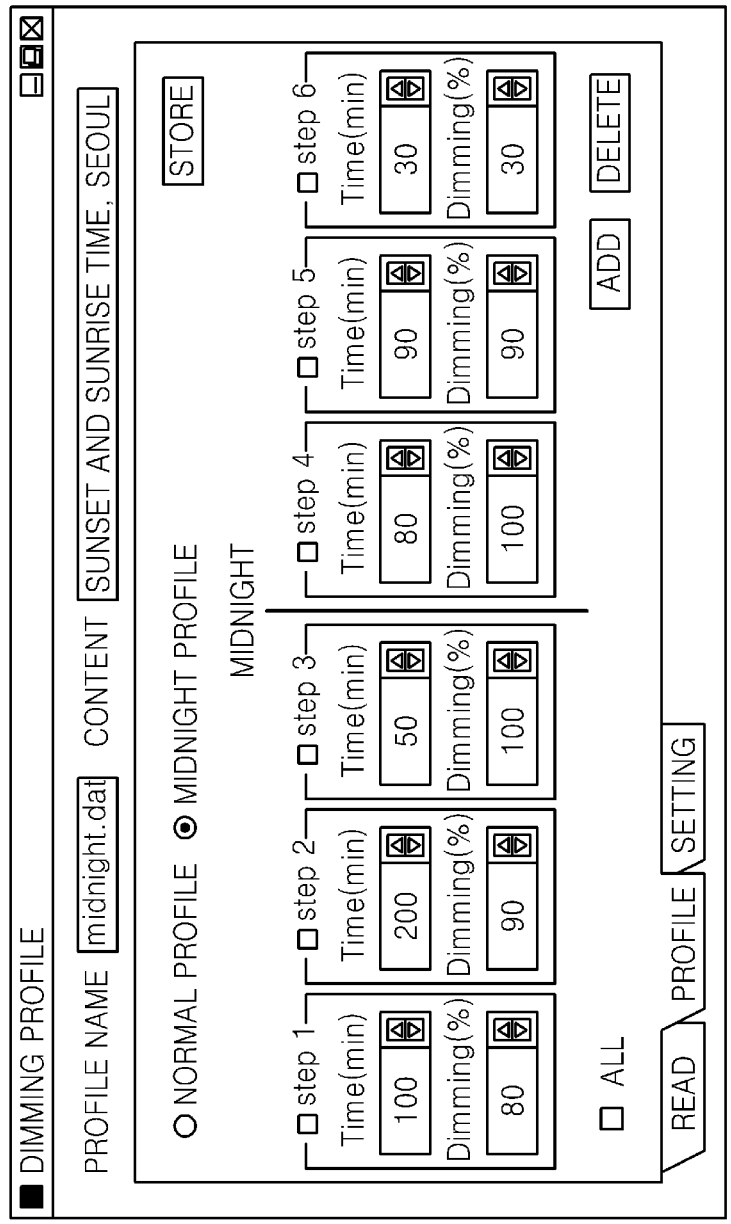

FIGS. 9 and 10 illustrate a screen on which generated dimming profiles including time zones and dimming levels are displayed, respectively, according to some embodiments of the present invention, and FIG. 11 illustrates a screen on which generated dimming profiles including parameters are displayed, according to another embodiment of the present invention.

FIG. 9 illustrates a screen on which an operation of dividing an operating time of the lighting appliance into 6 times zones and setting dimming levels corresponding to the time zones is displayed. After the time zones and the dimming levels are set, the name of a normal dimming profile is properly selected and stored in the storage unit (see 13 of FIG. 1 or 2). Steps from "step1" to "step6" from the time of operating the dimming controlling apparatus 10 are sequentially applied to the normal dimming profile. Thus, when the total sum of all time zones is greater than a total operating time of the dimming controlling apparatus 10, a dimming level corresponding to a time zone in the latter half, i.e., "step6" or "step5" may not be applied to the normal dimming profile. Contrary to this, when the total sum of all time zones is less than the total operating time of the dimming controlling apparatus 10, the remaining operating time after a dimming controlling time using the dimming profiles may be applied as a dimming level corresponding to a final time zone "step6".

FIG. 10 illustrates a screen on which an operation of dividing an operating time of the lighting appliance into 6 times zones, i.e., 3 time zones each before and after midnight and setting dimming levels corresponding to the time zones is displayed. In this regard, since the dimming levels set based on midnight are applied to a midnight dimming profile, a time zone far from the midnight time, i.e., "step1" or "step6" may vary according to the operating time of the dimming controlling apparatus 10. For example, it is assumed that a time length of "step1" is 100 minutes, a time length of "step2" is 200 minutes and a time length of "step3" is 50 minutes. In this regard, when the operating time of the dimming controlling apparatus 10 is 6:10 p.m., the operating time of the dimming controlling apparatus 10 until midnight and a total operating time of "step1" through "step3" are identical to each other. However, when the operating time of the dimming controlling apparatus 10 is 7:00 p.m., the operating time of the dimming controlling apparatus 10 until midnight is shorter than the total operating time of "step1" through "step3". In this regard, the dimming level corresponding to "step1" that is the time zone far from the midnight may be decreased by 50 minutes, and times set for "step2" and "step3" may be normal times. Contrary to this, when the operating time of the dimming controlling apparatus 10 is greater than the total operating time of "step1" through "step3", for example, when the operating time of the dimming controlling apparatus 10 is 5:00 p.m., the dimming level corresponding to "step1" may be increased by a quickened time.

FIG. 11 illustrates a screen in which an operation of setting dimming profiles to include parameters, such as countries, languages, locations (latitude and longitude), and standard time differences is displayed. Dimming profiles including parameters about locations of countries in the world are previously provided and are searched for conveniently by using parameters corresponding to the location where the lighting appliance is installed. The searched-for dimming file is used in driving the lighting appliance, thereby providing conveniences of management.

As an alternative for selecting a dimming profile by using software, a recording medium, for example, USB memory, may be used. A dimming profile to be used in the lighting appliance is selected by software installed on the management server 30, and then, information about the selected dimming profile is stored in the recording medium connected via USB, UDMA, or a serial/parallel port. After that, the recording medium is separated from the management server 30 and is connected to the dimming controlling apparatus 10 via USB, UDMA, or a serial/parallel port. The dimming controlling apparatus 10 receives information about the selected dimming profile stored in the recording medium and controls the lighting appliance based on the selected dimming profile. Comparing this method with the method described above, information about the selected dimming profile is not transmitted by the management server 30 directly to the dimming controlling apparatus 10, but is transmitted to the dimming controlling apparatus 10 from the management server 30 via the recording medium.

As described above, a dimming controlling apparatus according to the present invention divides an operating time of a lighting appliance into a plurality of time zones and generates dimming profiles to include intensity of illumination required to drive the lighting appliance in each of time zones and the time zones. The dimming controlling apparatus drives the lighting appliance based on the generated dimming profiles, thereby performing optimized lighting according to the purpose of the lighting appliance. In addition, according to the present invention, a management server generates a plurality of dimming profiles to include parameters, such as countries, languages, locations, and standard time differences and selects a predetermined dimming profile from the plurality of dimming profiles according to each of the parameters, and then, the dimming controlling apparatus drives the lighting appliance based on the selected dimming profile so that optimized lighting can be performed according to the environment and purpose of the lighting appliance. Furthermore, the dimming controlling apparatus according to the present invention controls the lighting appliance by using a sensing signal generated by at least one of a temperature sensor, an illumination intensity sensor and a movement sensor so that lighting optimized for the peripheral environment of the lighting appliance can be performed.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A dimming controlling apparatus comprising:
   a lighting driving unit for driving a lighting appliance;
   a power supply unit for supplying power required to drive the lighting appliance;
   a storage unit for storing a plurality of dimming profiles comprising time zones for driving the lighting appliance and dimming levels in accordance to the time zones;
   a sensor unit comprising at least one of a temperature sensor, an illumination intensity sensor, and a movement sensor and generating a sensing signal;
   a selection unit for selecting a dimming profile to be used in driving the lighting appliance from the plurality of dimming profiles stored in the storage unit; and
   a controller for controlling the lighting driving unit and the power supply unit by using at least one of the selected dimming profile and the sensing signal generated by the sensor unit,
   wherein the selection unit comprises a dip switch having at least one pin and selects a dimming profile corresponding to an on/off combination of the at least one pin of the dip switch from the plurality of dimming profiles.

2. The dimming controlling apparatus of claim 1, further comprising a communication unit for receiving the dimming profile by wired/wireless communication.

3. The dimming controlling apparatus of claim 2, wherein at least one dimming profile received by the communication unit is stored in the storage unit, and the controller controls the lighting driving unit and the power supply unit via the dimming profile selected from the at least one dimming profile through the communication unit.

4. The dimming controlling apparatus of claim 2, wherein the at least one dimming profile comprises at least one parameter of a country, a language, a location, and a standard time difference, and the controller controls the lighting driving unit and the power supply unit by using the dimming profile selected through the communication unit according to the at least one parameter.

5. A dimming controlling system comprising:
   a management server for generating a plurality of dimming profiles comprising time zones for driving a lighting appliance and dimming levels corresponding to the time zones; and
   at least one dimming controlling apparatus for driving the lighting appliance based on the dimming profiles,
   wherein the at least one dimming controlling apparatus comprises:
   a communication unit for receiving the dimming profiles from the management server by using wired/wireless communication;
   a storage unit for storing the plurality of dimming profiles;
   a lighting driving unit for driving the lighting appliance;
   a power supply unit for supplying power required to drive the lighting appliance;
   at least one of a temperature sensor, an illumination intensity sensor and a movement sensor for generating a sensing signal; and
   a selection unit for selecting a dimming profile to be used in driving the lighting appliance from the plurality of dimming profiles stored in the storage unit; and
   a controller for controlling the lighting driving unit and the power supply unit by using at least one of the selected dimming profile and the sensing signal generated by the at least one of the temperature sensor, the illumination intensity sensor, and the movement sensor,
   wherein the selection unit comprises a dip switch having at least one pin and selects a dimming profile corresponding to an on/off combination of the at least one pin of the dip switch from the plurality of dimming profiles.

6. The dimming controlling system of claim 5, wherein at least one dimming profile received by the communication unit is stored in the storage unit, and the controller controls the lighting driving unit and the power supply unit by using a dimming profile selected from the at least one dimming profile through the communication unit.

7. The dimming controlling system of claim 5, wherein the dimming profiles comprise at least one parameter of a country, a language, a location, and a standard time difference, and the controller controls the lighting driving unit and the power supply unit using the dimming profile selected by the management server according to the at least one parameter.

8. A dimming controlling method comprising:
   generating a plurality of dimming profiles comprising time zones for driving a lighting appliance and dimming levels corresponding to the time zones;
   transmitting the plurality of dimming profiles to a dimming controlling apparatus for controlling the lighting appliance;
   generating a sensing signal by using at least one of a temperature sensor, an illumination intensity sensor, and a movement sensor;
   storing the plurality of dimming profiles in a storage unit of the dimming controlling apparatus;
   selecting a dimming profile to be used in driving the lighting appliance from the plurality of dimming profiles stored in the storage unit of the dimming controlling apparatus by using a selection unit that comprises a dip switch having at least one pin and selects a dimming profile corresponding to an on/off combination of the at least one pin of the dip switch from the plurality of dimming profiles; and
   driving the lighting appliance based on at least one of the selected dimming profile and the generated sensing signal.

9. The dimming controlling method of claim 8, wherein the plurality of dimming profiles comprise at least one parameter of a country, a language, a location, and a standard time difference, and the lighting appliance is driven using the dimming profile selected according to the at least one parameter.

* * * * *